US011716751B2

(12) United States Patent
Zhang et al.

(10) Patent No.: US 11,716,751 B2
(45) Date of Patent: Aug. 1, 2023

(54) TECHNIQUES FOR NEW RADIO FRAME STRUCTURES FOR DATA TRANSMISSION

(71) Applicant: QUALCOMM Incorporated, San Diego, CA (US)

(72) Inventors: Xiaoxia Zhang, San Diego, CA (US); Taesang Yoo, Riverside, CA (US); Siddhartha Mallik, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 15/488,018

(22) Filed: Apr. 14, 2017

(65) Prior Publication Data

US 2018/0110056 A1    Apr. 19, 2018

Related U.S. Application Data

(60) Provisional application No. 62/410,217, filed on Oct. 19, 2016.

(51) Int. Cl.
*H04W 72/56* (2023.01)
*H04W 16/14* (2009.01)
*H04L 5/00* (2006.01)
*H04W 74/00* (2009.01)
*H04W 74/08* (2009.01)

(52) U.S. Cl.
CPC ........... *H04W 72/56* (2023.01); *H04L 5/0048* (2013.01); *H04W 16/14* (2013.01);
(Continued)

(58) Field of Classification Search
CPC combination set(s) only.
See application file for complete search history.

(56) References Cited

U.S. PATENT DOCUMENTS 9,420,472 B2    8/2016   Chen et al.
2015/0289293 A1*  10/2015  Zhang ................. H04W 74/002
                                                      455/404.1
(Continued)

FOREIGN PATENT DOCUMENTS

CN         1691555 A       11/2005
WO       2015047849         4/2015
(Continued)

OTHER PUBLICATIONS

International Search Report and Written Opinion—PCT/US2017/056520—ISA/EPO—dated Jan. 26, 2018.
(Continued)

*Primary Examiner* — Faruk Hamza
*Assistant Examiner* — Alan L Lindenbaum
(74) *Attorney, Agent, or Firm* — Arent Fox, LLP

(57) ABSTRACT

A method and apparatus for wireless communications are described. The method and apparatus may include transmitting at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities nonoverlapping with the second acquisition interval and the one or more second transmission opportunities.

27 Claims, 8 Drawing Sheets

(52) U.S. Cl.
CPC ..... *H04W 74/006* (2013.01); *H04W 74/0833* (2013.01); *H04W 74/0808* (2013.01)

(56) References Cited

U.S. PATENT DOCUMENTS

| | | | |
|---|---|---|---|
| 2015/0349931 A1 | 12/2015 | Damnjanovic et al. | |
| 2015/0373694 A1* | 12/2015 | You | H04L 5/0051 370/329 |
| 2016/0095018 A1 | 3/2016 | Vajapeyam et al. | |
| 2016/0227571 A1 | 8/2016 | Baek et al. | |

FOREIGN PATENT DOCUMENTS

| | | |
|---|---|---|
| WO | 2015152996 A1 | 10/2015 |
| WO | 2016081067 A1 | 5/2016 |

OTHER PUBLICATIONS

Taiwan Search Report—TW106135056—TIPO—dated Dec. 21, 2020.

Qualcomm Incorporated: "Advanced Frame Structure", 3GPP TSG-RAN WG1#86bis, 3GPP Draft, R1-1610132, Advanced_Frame_Structures, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 1, 2016 (Oct. 1, 2016), XP051159935, 9 Pages, Retrieved from the Internet: URL: http://www.3gpp.org/ftp/tsg_ran/WG1_RL1/TSGR1_86b/Docs/R1-1610132.zip [retrieved on Oct. 1, 2016], Chapter 3.

Nokia et al., "Multiple Operator Support in V2X", 3GPP TSG-RAN WG3 Meeting #92, R3-161234, Nanjing, China, May 23- 27, 2016, 3 Pages.

* cited by examiner

TECHNIQUES FOR NEW RADIO FRAME STRUCTURES FOR DATA TRANSMISSION

CROSS-REFERENCE TO RELATED APPLICATION(S)

This application claims the benefit of U.S. Provisional Application Ser. No. 62/410,217, entitled "TECHNIQUES FOR NEW RADIO FRAME STRUCTURES FOR DATA TRANSMISSION" and filed on Oct. 19, 2016, which is expressly incorporated by reference herein in its entirety.

BACKGROUND

Aspects of this disclosure relate generally to wireless communication networks, and more particularly to techniques for new radio (NR) frame structures for transmissions in a wireless communication network.

Wireless communication networks are widely deployed to provide various telecommunication services such as telephony, video, data, messaging, and broadcasts. Typical wireless communication networks may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

As the number of packets being transmitted increases with 5G, techniques are needed to provide efficient and improved process when communicating frames during wireless communications. In certain instances, as the next generation of wireless communications come into existence, more flexible transmissions may be desired in order to ensure adequate or improved levels of wireless communications. Thus, improvements in communication during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of wireless communications includes transmitting at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities nonoverlapping with the second acquisition interval and the one or more second transmission opportunities.

In accordance with an aspect, an apparatus for wireless communications includes means for transmitting at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities nonoverlapping with the second acquisition interval and the one or more second transmission opportunities. In accordance with an aspect, a computer-readable medium storing computer executable code for wireless communications includes code for transmitting at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities nonoverlapping with the second acquisition interval and the one or more second transmission opportunities.

In accordance with an aspect, an apparatus for wireless communications includes a memory and a processor coupled to the memory and configured to transmit at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities nonoverlapping with the second acquisition interval and the one or more second transmission opportunities.

In accordance with an aspect, a method of wireless communications at a network entity includes determining a duration of one or more first transmission opportunities within at least one frame and a priority for at least one of a first operator and a second operator. The method further includes transmitting the at least one frame according to the duration of at least the one or more first transmission opportunities or the priority for at least one of the first operator and the second operator.

In accordance with an aspect, an apparatus for wireless communications includes means for determining a duration of one or more first transmission opportunities within at least one frame and a priority for at least one of a first operator and a second operator. The apparatus further includes means for transmitting the at least one frame according to the duration of at least the one or more first transmission opportunities or the priority for at least one of the first operator and the second operator.

In accordance with an aspect, a computer-readable medium storing computer executable code for wireless communications includes code for determining a duration of one or more first transmission opportunities within at least one frame and a priority for at least one of a first operator and a second operator. The computer-readable medium further includes transmitting the at least one frame according to the duration of at least the one or more first transmission opportunities or the priority for at least one of the first operator and the second operator.

accordance with an aspect, an apparatus for wireless communications includes a memory and a processor coupled to the memory. The processor configured to determine a duration of one or more first transmission opportunities within at least one frame and a priority for at least one of a first operator and a second operator. The processor further configured to transmit the at least one frame according to the duration of at least the one or more first transmission opportunities or the priority for at least one of the first operator and the second operator.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1A:
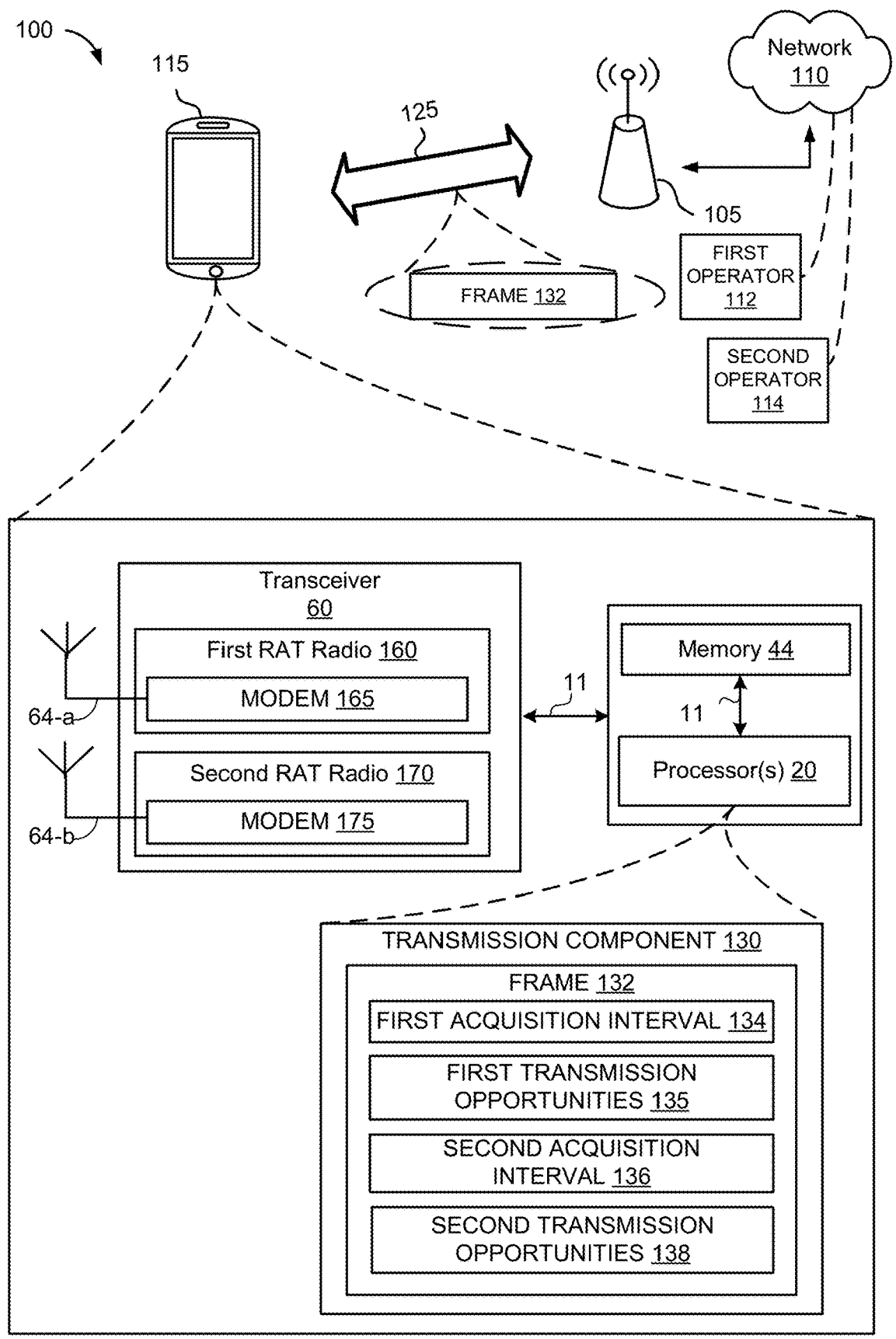
FIG. 1A is a schematic diagram of a wireless communication network including an aspect of a transmission component for wireless communications in accordance with one or more exemplary aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to a frame structure for new radio shared spectrum. Specifically, current implementations may be unsuited for facilitating communication between user equipments (UEs) and network entities supporting multiple operators. For example, an operator may be or otherwise correspond to a provider of wireless service. In particular, current implementations may either inefficiently utilize available spectrum associated with a particular radio access technology (RAT) across multiple operators, or may be unable to utilize available spectrum in conjunction with another operator. As such, a frame structure that allows for or otherwise facilitates multiple operator communication may be desirable. For instance, the frame structure may provide shared medium access by multiple operators in a new radio shared spectrum system.

Accordingly, in some aspects, the present methods and apparatuses may provide an efficient solution, as compared to conventional solutions, by providing a frame structure for shared medium access by multiple operators in a new radio shared spectrum. In other words, in the present aspects, a UE or gNB may efficiently and effectively transmit at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities non-overlapping with the second acquisition interval and the one or more second transmission opportunities. Further, the present aspects provide one or more mechanisms for determining, at a network entity, a duration of one or more first transmission opportunities within at least one frame and a priority for at least one of a first operator and a second operator, and transmitting the at least one frame according to the duration of at least the one or more first transmission opportunities or the priority for at least one of the first operator and the second operator.

Figure 1B:
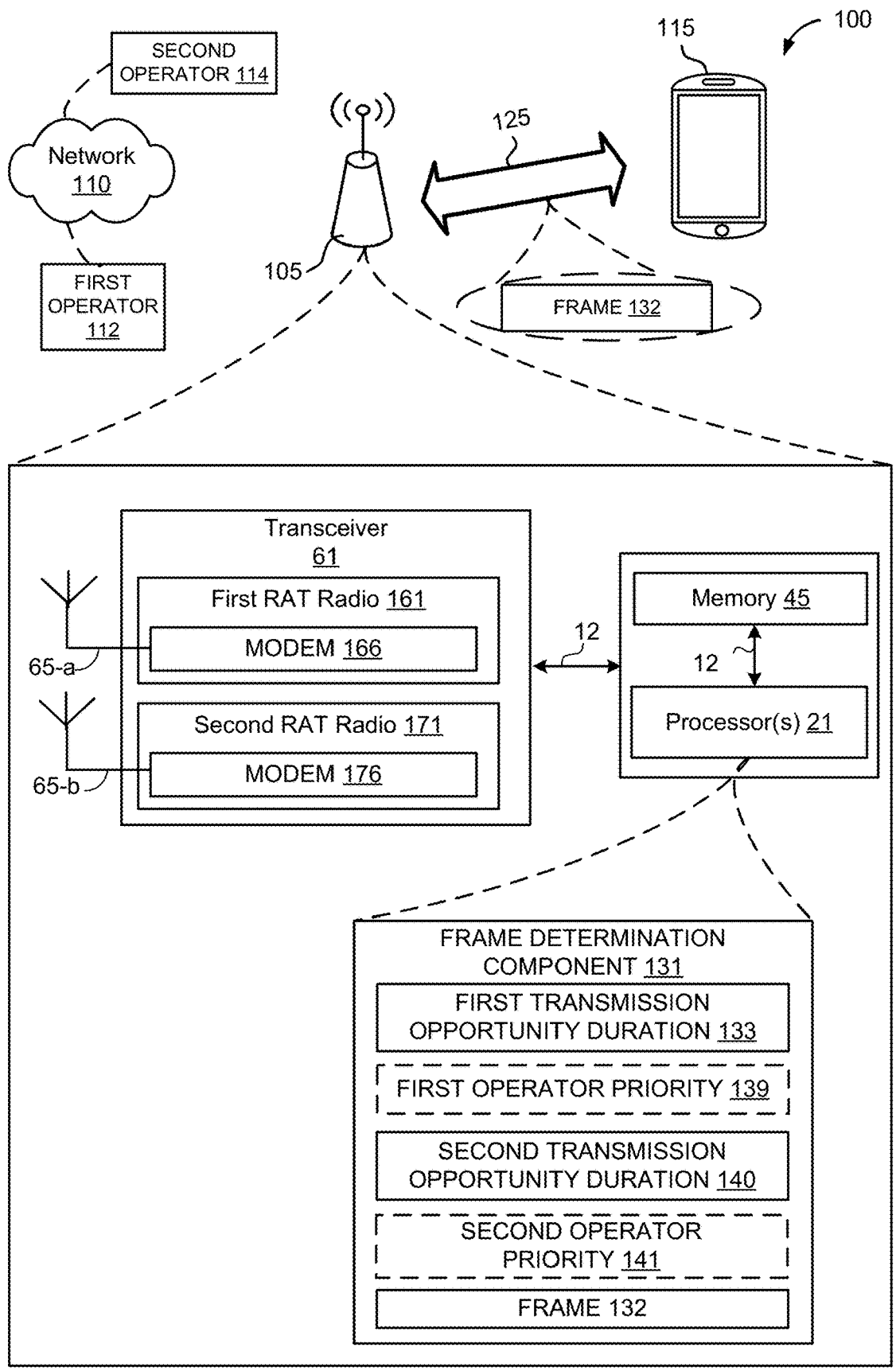
FIG. 1B is a schematic diagram of a wireless communication network including an aspect of a frame determination component for wireless communications in accordance with one or more exemplary aspects.

Referring to FIGS. 1A and 1B, in an aspect, a wireless communication system 100 includes at least one user equipment (UE) 115 in communication coverage of at least network entities 105. The UE 115 may communicate with network 110 via the network entity 105. In an example, the UE 115 may transmit and/or receive wireless communication to and/or from the network entity 105 via one or more communication channels 125. The one or more communication channels 125 may include an uplink communication channel (or simply uplink channel bandwidth region) for transmission of data from the UE 115 to the network entity 105 and a downlink communication channel (or simply downlink channel bandwidth region) for transmission of data from the network entity 105 to the UE 115, such as but not limited to an uplink data channel and/or downlink data channel. Such wireless communications may include, but are not limited to, data, audio and/or video information. Moreover, in an example, the wireless communications between the UE 115 and the network entity 105 may include 5G new radio (NR) communications.

Referring to FIG. 1A, in accordance with the present disclosure, the UE 115 may include a memory 44, one or more processors 20 and a transceiver 60. The memory 44, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor, or any other processor that may, for example, transmit at least one frame 132 that includes a first acquisition interval 134 associated with a first operator 112 and one or more first transmission opportunities 135 having a guarantee interval for the first operator 112, and a second acquisition interval 136 associated with a second operator 114 different from the first operator 112 and one or more second transmission opportunities 138 having a guarantee interval for the second operator 114, the first acquisition interval 134 and the one or more first transmission opportunities 135 nonoverlapping with the second acquisition interval 136 and the one or more second transmission opportunities 138.

Additionally or alternatively, the one or more processors 20 may include a transmission component 130 for carrying out one or more methods or procedures described herein. In an aspect, the term "component" as used herein may be one of the parts that make up a system, may be hardware, firmware, and/or software, and may be divided into other components. The transmission component 130, and each of its subcomponents, may comprise hardware, firmware, and/ or software and may be configured to execute code or perform instructions stored in a memory (e.g., a computer-readable storage medium).

In some examples, the UE 115 may include the memory 44, such as for storing data used herein and/or local versions of applications or communication with transmission component 130 and/or one or more of its subcomponents being executed by the one or more processors 20. The memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, the memory 44 may be a computer-readable storage medium (e.g., a non-transitory medium) that stores one or more computer-executable codes defining transmission component 130 and/or one or more of its subcomponents, and/or data associated therewith, when the UE 115 is operating one or more processors 20 to execute the transmission component 130 and/or one or more of its subcomponents. In some examples, the UE 115 may further include a transceiver 60 for transmitting and/or receiving one or more data and control signals to/from the network via the network entity 105. The transceiver 60 may comprise hardware, firmware, and/or software and may be configured to execute code or perform instructions stored in a memory (e.g., a computer-readable storage medium). The transceiver 60 may include a first radio access technology (RAT) radio 160 (e.g. UMTS/ WCDMA, LTE-A, WLAN, Bluetooth, WSAN-FA) comprising a modem 165 (e.g., a first modem), and a second RAT radio 170 (e.g., 5G) comprising a modem 175 (e.g., a second modem). The first RAT radio 160 and second RAT radio 170 may utilize one or more antennas 64 for transmitting signals to and receiving signals from the network entity 105. In some examples, the transceiver 60 may include one of the first RAT radio 160 or the second RAT radio 170.

For example, the UE 115 may include the transmission component 130, which may be configured to facilitate transmission of a frame 132 according to a new radio shared spectrum frame structure on one or more uplink communication channels to the network entity 105. Specifically, UE 115 may transmit one or more frames including the frame 132 in accordance with a frame structure that facilities transmission on subframes or symbols associated with multiple or different operators. Similarly, a gNB may transmit one or more frames and UE may receive one or more frames in accordance with a frame structure that facilities transmission on subframes or symbols associated with multiple or different operators.

Figure 2:
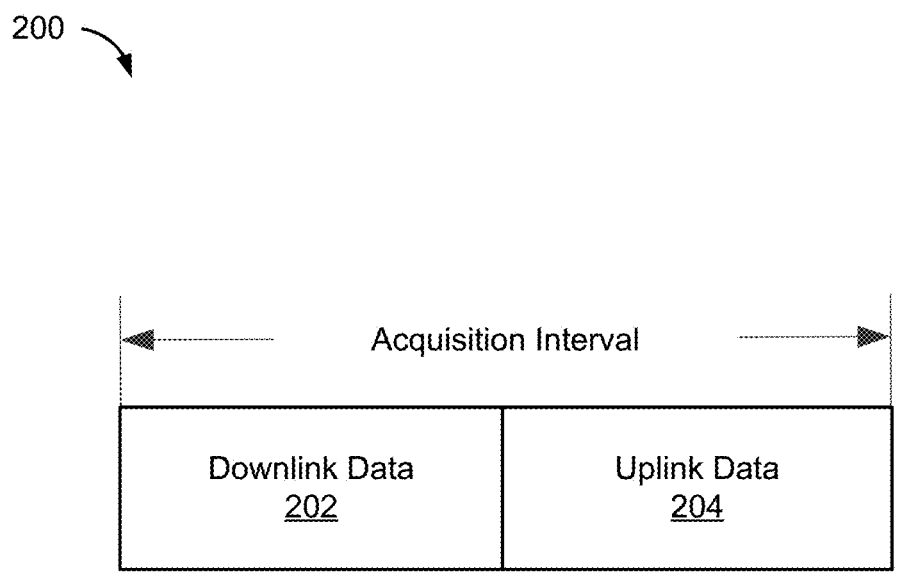
FIG. 2 is a conceptual diagram of an example acquisition interval in accordance with one or more exemplary aspects.
Figure 3:
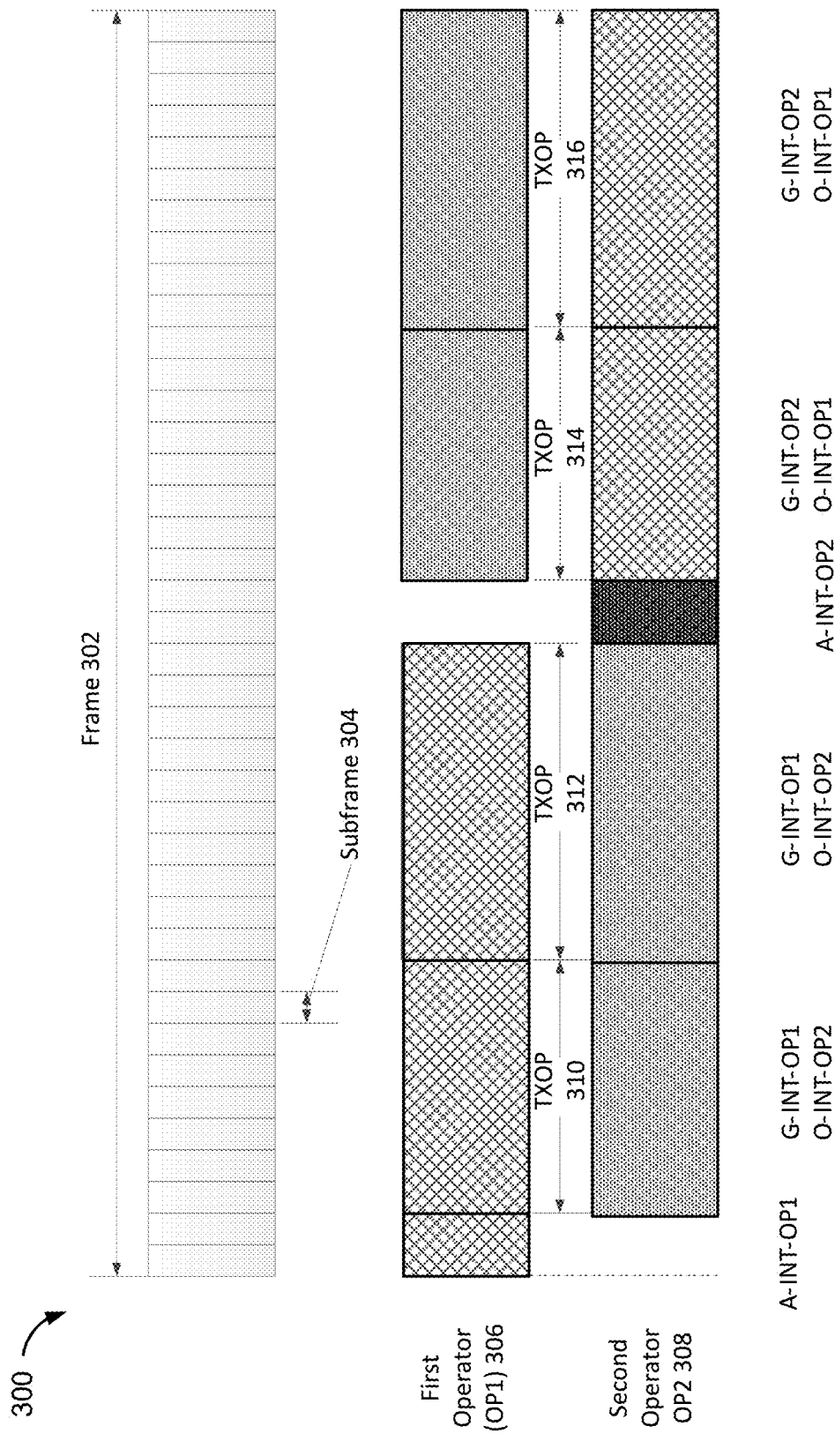
FIG. 3 is a conceptual diagram of a staggered frame structure for at least two operators in accordance with one or more exemplary aspects.
Figure 4:
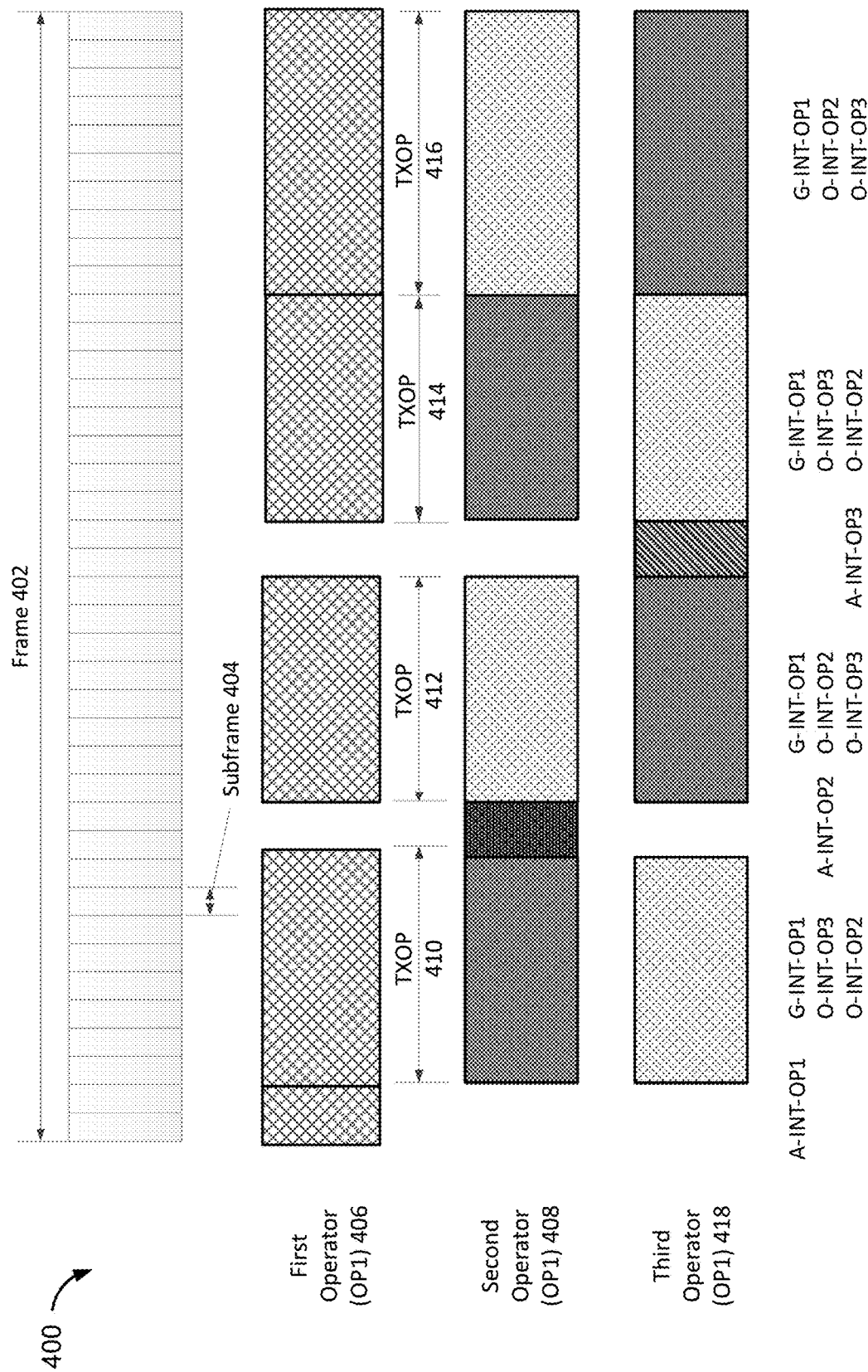
FIG. 4 is a conceptual diagram of a staggered frame structure for at least two operators in accordance with one or more exemplary aspects.
Figure 5:
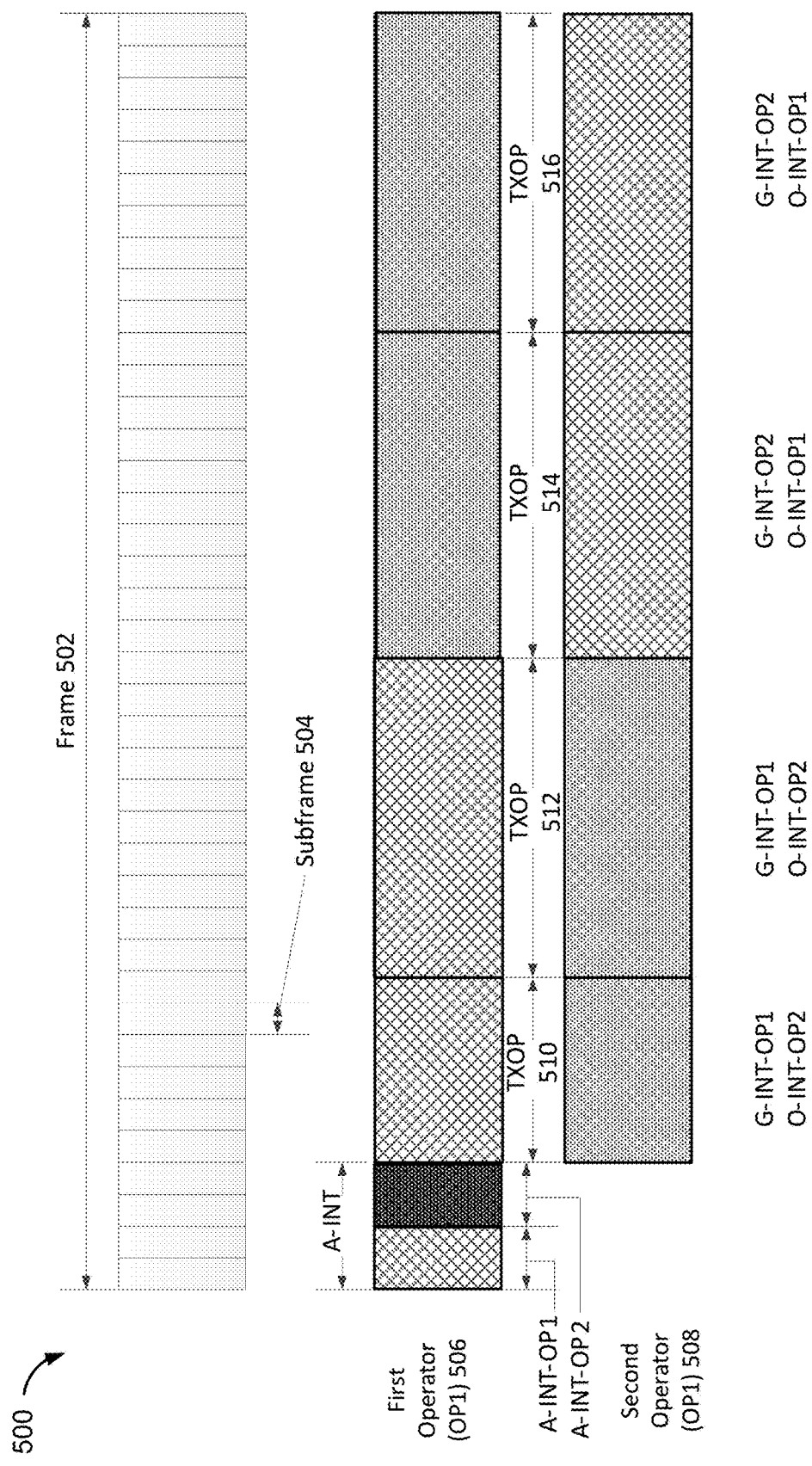
FIG. 5 is a conceptual diagram of an aligned frame structure for at least two operators in accordance with one or more exemplary aspects.

In some aspects, the frame 132 (i.e., examples of which are illustrated in FIGS. 3-5) may include a first acquisition interval 134 (e.g., as illustrated in FIG. 2) associated with a first operator 112 and one or more first transmission opportunities 135 having a guarantee interval for the first operator 112. The frame 132 may further include a second acquisition interval 136 associated with a second operator 114 different from the first operator 112 and one or more second transmission opportunities 138 having a guarantee interval for the second operator 114. In some aspects, the first acquisition interval 134 and the one or more first transmission opportunities 135 may be nonoverlapping with the second acquisition interval 136 and the one or more second transmission opportunities 138.

Further, in some aspects, the frame 132 may be scheduled for or otherwise be included as part of a transmission at periodic intervals. For instance, the frame 132 may begin with an acquisition interval (e.g., first acquisition interval 134 and/or second acquisition interval 136) and followed by one or more transmission opportunities (e.g., one or more first transmission opportunities 135 and/or second transmission opportunities 138).

In some aspects, the first acquisition interval 134 and the second acquisition interval 136 may allow each operator (e.g., first operator 112 and/or second operator 114, respectively) to send at least one of a downlink discovery reference signal (DRS) or an uplink random access channel (RACH), or in some cases, system critical information or discovery signal. The DRS may include primary synchronization signal (PSS) and/or secondary synchronization signal (SSS)

and/or physical broadcast channel (PBCH) and/or reference signal (RS), etc. As such, the first acquisition interval 134 and the second acquisition interval 136 may be utilized solely by the associated operator, e.g., the first operator 112 in the case of the first acquisition interval 134 and the second operator 114 in the case of the second acquisition interval 136. In some aspects, the first acquisition interval 134 and/or the second acquisition interval 136 may include at least one of a downlink clear channel assessment (CCA) exempt transmission (DL-CET) or an uplink CET (UL-CET).

Further, in some aspects, the first guarantee interval guarantees the first operator 112 a transmitting opportunity and the second guarantee allows the second operator 114 a transmitting opportunity. That is, the guarantee interval of the one or more first transmission opportunities 135 and/or the one or more second transmission opportunities 138 may respectively prioritize medium access without contention to the first operator 112 and the second operator 114. In other words, an indication that or an assignment of a given transmission opportunity to a particular operator as a guarantee interval guarantees or ensures that the particular operator has prioritized access to the given transmission opportunity prior to or before other operators.

For example, in some aspects, to provide such prioritized access of transmission opportunities, the first operator 112 may be associated with a first priority and the second operator 114 may be associated with a second priority. The relative ordering or comparative values of the priorities may be indicative of an access level of the transmission opportunities. For instance, in some aspects, the first priority may be greater than the second priority within the one or more first transmission opportunities 135 having the guarantee interval for the first operator 112. Further, in some aspects, the second priority may be greater than the first priority within the one or more second transmission opportunities 138 having the guarantee interval for the second operator 114. Although two operators are illustrated and described herein, the frame 132 may accommodate two or more operators according to a similar frame structure as described herein with respect to two operators.

Additionally, the transmission opportunities may include opportunistic intervals permitting or otherwise providing medium access for an operator having a priority level lower than the first priority of the first operator 112 or the second priority of the second operator 114. For example, the one or more first transmission opportunities 135 further include an opportunistic interval for at least the second operator 114 and the one or more second transmission opportunities 138 further include an opportunistic interval for at least the first operator 112.

Further, in some aspects, the location of the first acquisition interval 134 and the second acquisition interval 138 may be dynamic based on the transmission scheme. For example, in a staggered approach as illustrated in FIGS. 3 and 4, the first acquisition interval 134 may be adjacent to and followed by the one or more first transmission opportunities 134 and the second acquisition interval 136 may be adjacent to and followed by the one or more second transmission opportunities 138. Further, in an aligned approach as illustrated in FIG. 5, the first acquisition interval 134 may be adjacent to the second acquisition interval 136 and followed by the one or more first transmission opportunities 135 and the one or more second transmission opportunities 138.

Further, the UE 115, and in particular transmission component 130 may configure the frame structure of frame 132 based on frame configuration information received from the network entity 105. For example, transmission component 130 may be configured to receive, from the network entity 105, an indication including one or both of a duration of at least one of the one or more first transmission opportunities 135 or the one or more second transmission opportunities 138 within the at least one frame 132, or a priority for each of the first operator 112 and the second operator 114. Accordingly, the at least one frame 132 may be transmitted or received according to one or both of the duration of at least one of the one or more first transmission opportunities 135 or the one or more second transmission opportunities 138 or the priority for each of the first operator 112 and the second operator 114. In some aspects, the multiple operators (e.g., first operator 112, second operator 114, etc.) may be synchronous or synchronized based on, for example, global positioning system (GPS) signaling, network listening, and/or UE-assisted discovery.

The UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. The UE 115 may be able to communicate with macro eNodeBs, small cell eNodeBs, relays, and the like. The UE 115 may also be able to communicate over different access networks, such as cellular or other WWAN access networks, or WLAN access networks.

Additionally, as used herein, the one or more wireless nodes or wireless serving nodes, including, but not limited to, network entity 105 of wireless communication system 100, may include one or more of any type of network component, such as an access point, including a base station or node B, an eNodeB a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more macro and/or small cell base stations, such as, but not limited to a femtocell, picocell, microcell, or any other base station having a relatively small transmit power or relatively small coverage area as compared to a macro base station.

Referring to FIG. 1B, in accordance with the present disclosure, the network entity 105 may include a memory 45, one or more processors 21 and a transceiver 61. The memory 45, one or more processors 21 and the transceiver 61 may communicate internally via a bus 12. In some examples, the memory 45 and the one or more processors 21 may be part of the same hardware component (e.g., may be part of a same board, module, or integrated circuit). Alternatively, the memory 45 and the one or more processors 21 may be separate components that may act in conjunction with one another. In some aspects, the bus 12 may be a communication system that transfers data between multiple components and subcomponents of the network entity 105. In some examples, the one or more processors 21 may include any one or a combination of modem processor, baseband processor, digital signal processor and/or transmit processor, or any other processor that may, for example, determine a duration of one or more first transmission opportunities within at least one frame and a priority for at least one of a first operator and a second operator, and transmit the at least one frame according to the duration of at least the one or more first transmission opportunities or the priority for at least one of the first operator and the second operator.

Additionally or alternatively, the one or more processors 21 may include a frame determination component 131 for carrying out one or more methods or procedures described herein. In an aspect, the term "component" as used herein may be one of the parts that make up a system, may be hardware, firmware, and/or software, and may be divided into other components. The frame determination component 131, and each of its subcomponents, may comprise hardware, firmware, and/or software and may be configured to execute code or perform instructions stored in a memory (e.g., a computer-readable storage medium).

In some examples, the network entity 105 may include the memory 45, such as for storing data used herein and/or local versions of applications or communication with frame determination component 131 and/or one or more of its subcomponents being executed by the one or more processors 21. The memory 45 can include any type of computer-readable medium usable by a computer or processor 21, such as random access memory (RAM), read only memory (ROM), tapes, magnetic discs, optical discs, volatile memory, non-volatile memory, and any combination thereof. In an aspect, for example, the memory 45 may be a computer-readable storage medium (e.g., a non-transitory medium) that stores one or more computer-executable codes defining the frame determination component 131 and/or one or more of its subcomponents, and/or data associated therewith, when the network entity 105 is operating one or more processors 21 to execute the frame determination component 131 and/or one or more of its subcomponents. In some examples, the network entity 105 may further include a transceiver 61 for transmitting and/or receiving one or more data and control signals to/from the UE 115. The transceiver 61 may comprise hardware, firmware, and/or software and may be configured to execute code or perform instructions stored in a memory (e.g., a computer-readable storage medium). The transceiver 61 may include a first radio access technology (RAT) radio 161 (e.g. UMTS/WCDMA, LTE-A, WLAN, Bluetooth, WSAN-FA) comprising a modem 166 (e.g., a first modem), and a second RAT radio 171 (e.g., 5G) comprising a modem 176 (e.g., a second modem). The first RAT radio 161 and second RAT radio 171 may utilize one or more antennas 65 for transmitting signals to and receiving signals from the UE 115. In some examples, the transceiver 61 may include one of the first RAT radio 161 or the second RAT radio 171.

For example, the network entity may include the frame determination component 131, which may be configured to determine one or more characteristics of the frame 132 including, but not limited to, a duration of one or more transmission opportunities or a priority of an operator. Specifically, the frame determination component 131 may be configured to determine a first transmission opportunity duration for one or more first transmission opportunities 133 and/or a second transmission opportunity duration 140 for one or more second transmission opportunities 138. For example, the duration may span across one or more symbols forming the frame 132.

Further, the frame determination component 131 may be configured to determine at least one of a first operator priority 139 and/or a second operator priority 141. That is, frame determination component 131 may be configured to determine at least priority levels for one or more operators. However, frame determination component 131 may determine and/or configure the one or more characteristics (e.g., priority level, transmission opportunities, etc.) of the structure of frame 132 for one or more operators. The network entity 105 may be configured to transmit the at least one frame 132 according to at least the first transmission opportunity duration 133, the first operator priority 139, the second transmission opportunity duration 140, and/or the second operator priority 141. Further, the frame structure of frame 132 transmitted to the UE 115 on one or more downlink channels may include or be of the same or similar structure as described herein with respect to FIG. 1A.

Additionally, in some aspects, frame determination component 131 may be configured to transmit an offset indication on a physical broadcast channel (PBCH). For example, at least one of the first acquisition interval 134 or the second acquisition interval 136 may be transmitted on the PBCH and indicates an offset relative to a boundary of the at least one frame. Further, in some aspects, network entity 105 may be configured to transmit a demodulation reference signal (DMRS) to the UE 115 adjacent to the at least one frame for decoding the PBCH. In some aspects, frame determination component 131 may be located at a central entity such as, but not limited to a substation automation system (SAS) and/or a coexistence manager (CXM).

FIG. 2 is a conceptual diagram of an example acquisition interval 200 for a single transmission opportunity in accordance with one or more exemplary aspects. For example, the acquisition interval 200 may be the same as or similar to the first acquisition interval 134 (FIG. 1A) and/or the second acquisition interval 136 (FIG. 1A). Further, in some aspects, the acquisition interval 200 may allow each operator to send downlink data 202 including reference signals such as a DRS, system information, and/or discovery signals. Additionally, the acquisition interval 200 may allow each operator to send uplink data 204 such as RACH data, system information, and/or discovery signals. In some aspects, an acquisition interval may be allocated to a given operator. As such, that operator may be authorized to use the acquisition interval whereas other operator may be barred from using that acquisition interval (although may use other acquisition intervals that are assigned to them).

FIG. 3 is a conceptual diagram of a staggered frame structure 300 for at least two operators (e.g., first operator 306 and second operator 308) in accordance with one or more exemplary aspects. For example, the staggered frame structure 300 may be implemented utilizing frame 302, which may in some aspects correspond to frame 132 (FIGS. 1A and 1B), in a communication system supporting at least two operators. In some aspects, the frame 302 may be 10 milliseconds and/or each subframe 304 may be 250 microseconds. The staggered frame structure 300 may include a distinct acquisition interval assigned to or for exclusive use by each operator such that each acquisition interval is staggered or non-adjacent. The remaining portion of the frame 302 may be divided into multiple transmission opportunities. For instance, each transmission opportunity may be guaranteed for the highest priority operator and an opportunistic interval for the other operator(s). As such, as shown in FIG. 3, the first and second transmission opportunities 310 and 312 may be guaranteed for the first operator 306, and the third and fourth transmission opportunities 314 and 316 may be guaranteed for the second operator 308. Further, the third and fourth transmission opportunities 314 and 316 may be opportunistic intervals for the first operator 306 and the first and second transmission opportunities 310 and 312 may be opportunistic intervals for the second operator 308.

FIG. 4 is a conceptual diagram of a staggered frame structure 400 for at least three operators (e.g., first operator 406, second operator 408, and third operator 418) in accordance with one or more exemplary aspects. For instance, the staggered frame structure 400 may be implemented utilizing frame 402, which may in some aspects correspond to frame 132 (FIGS. 1A and 1B) in an communication system supporting at least three operators. In some aspects, the frame 402 may be 10 milliseconds and/or each subframe 404 may be 250 microseconds. The staggered frame structure 400 may include a unique acquisition interval assigned to or for exclusive use by each operator in a staggered manner such that the unique acquisition intervals associated with each operator are non-adjacent. The remaining portion of the frame 402 may be divided into multiple transmission opportunities. For instance, each transmission opportunity may be guaranteed for the highest priority operator (e.g., first operator 406) and an opportunistic interval for the other operator(s). As such, as shown in FIG. 4, the first, second, third and fourth transmission opportunities 410, 412, 414, ad 416 may be guaranteed for the first operator 306. Further, the second operator 408 may have the second highest priority for the second and fourth transmission opportunities 412 and 416 and the third highest priority for the first and second transmission opportunities 410 and 414. The third operator 418 may have the second highest priority for the first and third transmission opportunities 410 and 414 and the third highest priority for the second and fourth transmission opportunities 412 and 416. The priority levels may be indicative of an order of access of the transmission opportunities, with a highest priority operator having an opportunity to access the available timeslot for data transmission prior to the lower priority operators.

FIG. 5 is a conceptual diagram of an aligned frame structure 500 for at least two operators (e.g., first operator 306 and second operator 308) in accordance with one or more exemplary aspects. For example, the aligned frame structure 500 may be implemented utilizing frame 502, which may in some aspects correspond to frame 132 (FIGS. 1A and 1B) in an communication system supporting at least two operators. In some aspects, the frame 402 may be 10 milliseconds and/or each subframe 404 may be 250 microseconds. The aligned frame structure 500 may include a distinct acquisition interval for each operator in an adjacent manner. That is, an acquisition interval of the first operator 506 may be adjacent to an acquisition interval of the second operator 508. The remaining portion of the frame 502 may be divided into multiple transmission opportunities. For instance, each transmission opportunity may be guaranteed for the highest priority operator and an opportunistic interval for the other operator(s). As such, as shown in FIG. 5, the first and second transmission opportunities 510 and 512 may be guaranteed for the first operator 506, and the third and fourth transmission opportunities 514 and 516 may be guaranteed for the second operator 508. Further, the third and fourth transmission opportunities 514 and 516 may be opportunistic intervals for the first operator 506 and the first and second transmission opportunities 510 and 512 may be opportunistic intervals for the second operator 508. Further note that each transmission opportunity may or may not have the same duration.

Figure 6:
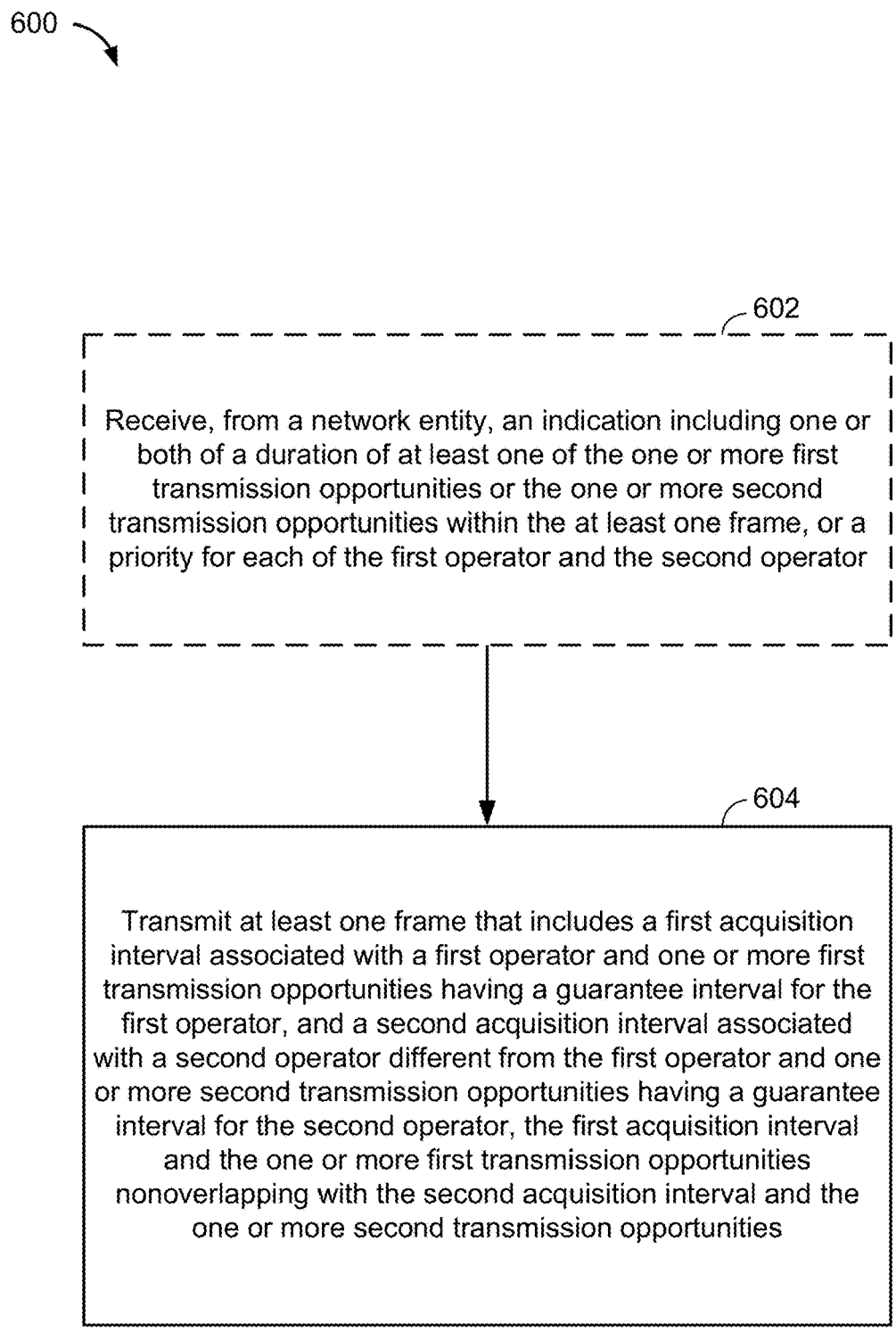
FIG. 6 is a flow diagram illustrating an exemplary method of communications in a wireless communication system in accordance with one or more exemplary aspects.

FIG. 6 is a flow diagram illustrating examples of a method 600 related to transmission of at least one (new radio shared spectrum) frame in accordance with various aspects of the present disclosure. Although the operations described below are presented in a particular order and/or as being performed by an example component, the ordering of the actions and the components performing the actions may be varied, depending on the implementation. Also, although the transmission component 130 (FIG. 1A) is illustrated as having a number of subcomponents, one or more of the illustrated subcomponents may be separate from, but in communication with, the transmission component 130, and/or each other. Moreover, any of actions or components described below with respect to the transmission component 130 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

In an aspect, at block 602, the method 600 may receive, from a network entity, an indication including one or both of a duration of at least one of the one or more first transmission opportunities or the one or more second transmission opportunities within the at least one frame, or a priority for each of the first operator and the second operator. In an aspect, for example, the UE 115 (FIG. 1A) may execute the transceiver 60 (FIG. 1A) to receive, from a network entity 105 (FIG. 1A), an indication including one or both of a duration (e.g., first transmission opportunity duration 133 and/or second transmission opportunity duration 140, FIG. 1B) of at least one of the one or more first transmission opportunities 135 (FIG. 1A) or the one or more second transmission opportunities 138 (FIG. 1A) within the at least one frame 132 (FIG. 1A), or a priority for each of the first operator 112 (FIG. 1A) and the second operator 114 (FIG. 1A).

In some aspects, the at least one frame may be transmitted according to one or both of the duration of at least one of the one or more first transmission opportunities 135 or the one or more second transmission opportunities 138 or the priority for each of the first operator 112 and the second operator 114.

At block 604, the method 600 may transmit at least one frame that includes a first acquisition interval associated with a first operator and one or more first transmission opportunities having a guarantee interval for the first operator, and a second acquisition interval associated with a second operator different from the first operator and one or more second transmission opportunities having a guarantee interval for the second operator, the first acquisition interval and the one or more first transmission opportunities non-overlapping with the second acquisition interval and the one or more second transmission opportunities. In an aspects, for example, the UE 115 (FIG. 1A) or the gNB may execute the transmission component 130 (FIG. 1A) and/or transceiver 60 (FIG. 1A) to transmit at least one frame 132 (FIG. 1A) that includes a first acquisition interval 134 (FIG. 1A) associated with a first operator 112 and one or more first transmission opportunities 135 having a guarantee interval for the first operator 112, and a second acquisition interval 136 (FIG. 1A) associated with a second operator 114 different from the first operator 112 and one or more second transmission opportunities 138 having a guarantee interval for the second operator 114, the first acquisition interval 134 and the one or more first transmission opportunities 135 nonoverlapping with the second acquisition interval 136 and the one or more second transmission opportunities 138.

In some aspects, the guarantee interval of the one or more first and second transmission opportunities 135, 138 may respectively prioritize medium access without contention to the first operator 112 and the second operator 114. That is, in some aspects, a first guarantee interval guarantees the first operator 112 a transmission opportunity in the one or more first transmission opportunities 135 and the second guarantee interval guarantees the second operator 114 a transmission opportunity in the one or more second transmission opportunities 138.

In some aspects, the first operator 112 may be associated with a first priority (e.g., first operator priority 139, FIG. 1B) and the second operator 114 may be associated with a second priority (e.g., second operator priority 141, FIG. 1B). In some aspects, the first priority may be greater than the second priority within the one or more first transmission opportunities 135 having the guarantee interval for the first operator 112. In some aspects, the second priority may be greater than the first priority within the one or more second transmission opportunities 138 having the guarantee interval for the second operator 114.

In some aspects, the one or more first transmission opportunities 135 further include an opportunistic interval for at least the second operator 114 and the one or more second transmission opportunities 138 further include an opportunistic interval for at least the first operator 112. In some aspects, the opportunistic interval of the one or more first and second transmission opportunities 135, 138 may allow medium access for an operator having a priority level lower than the first priority or the second priority.

In some aspects, if a transmission opportunity from the one or more first or second transmission opportunities 135, 138 remains available following utilization or allocation by a respective operator (e.g., first operator 112) having the highest priority (e.g., guarantee interval), then another operator (e.g., second operator 114) having the next highest priority (e.g., opportunistic interval) may utilize the available transmission opportunity. For example, the first operator 112 may be allocated at least two transmission opportunities forming the one or more first transmission opportunities 135 proximate a first acquisition interval 134 based on a designation that such transmission opportunities are guaranteed (e.g., guarantee intervals for the first operator 112). If the first operator does not transmit on all transmission opportunities (e.g., transmits on a single transmission opportunity, thereby leaving one available), then the second operator 114, or another operator having a next highest priority (e.g., corresponding to an opportunistic interval) may transmit on the available transmission opportunity.

In some aspects, the first acquisition interval 134 and the second acquisition interval 136 may include at least one of a DRS allocation or a RACH allocation. In some aspects, the first acquisition interval 134 may be adjacent to and followed by the one or more first transmission opportunities 135 and the second acquisition interval 134 may be adjacent to and followed by the one or more second transmission opportunities 138.

In some aspects, the first acquisition interval 134 may be adjacent to the second acquisition interval 136 and followed by the one or more first transmission opportunities 135 and the one or more second transmission opportunities 138. Additionally, in some aspects, the first acquisition interval 134 and the second acquisition interval 136 may each include at least one of a DL-CET or an UL-CET. In some aspects, transmitting the at least one frame 132 includes transmitting on an uplink channel from a UE 115 (FIG. 1A) to a network entity 105 (FIG. 1A).

Figure 7:
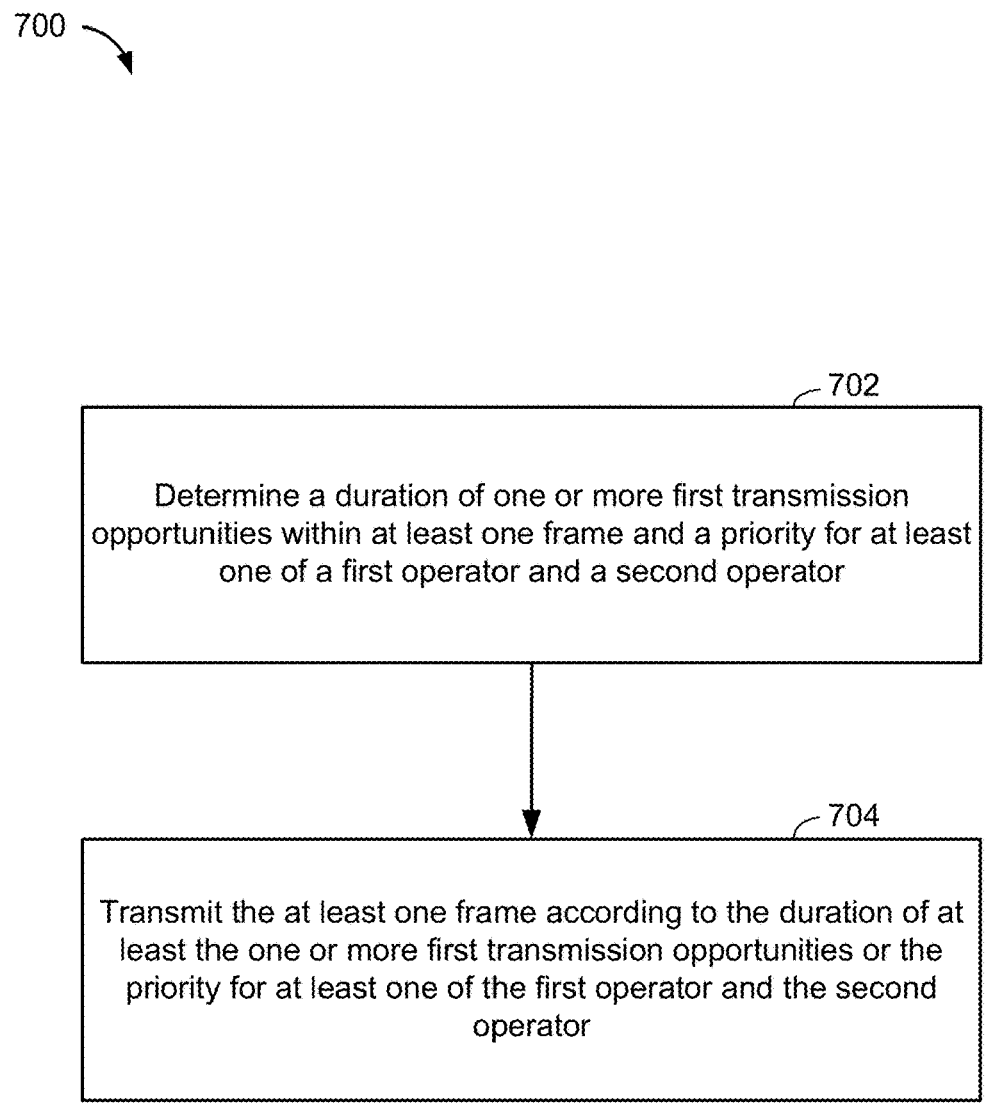
FIG. 7 is a flow diagram illustrating an exemplary method of wireless communications at a network entity in accordance with one or more exemplary aspects.

FIG. 7 is a flow diagram illustrating examples of a method 700 related to wireless communication by a network entity using a new radio shared spectrum frame structure in accordance with aspects of the present disclosure. Although the operations described below are presented in a particular order and/or as being performed by an example component, the ordering of the actions and the components performing the actions may be varied, depending on the implementation. Also, although the frame determination component 131 (FIG. 1B) is illustrated as having a number of subcomponents, one or more of the illustrated subcomponents may be separate from, but in communication with, the frame determination component 131, and/or each other. Moreover, any of actions or components described below with respect to the frame determination component 131 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

At block 702, the method 700 may determine a duration of one or more first transmission opportunities within at least one frame and a priority for at least one of a first operator and a second operator. In an aspect, for example, network entity 105 (FIG. 1B) and/or frame determination component 131 (FIG. 1B) may determine a duration of one or more first transmission opportunities (e.g., first transmission opportunity duration 133, FIG. 1B) within at least one frame 132 (FIG. 1B) and a priority (e.g., first operator priority 139 and/or second operator priority 141, FIG. 1B) for at least one of a first operator 112 (FIG. 1B) and a second operator 114 (FIG. 1B).

Further, at block 704, the method 700 may transmit the at least one frame according to the duration of at least the one or more first transmission opportunities or the priority for at least one of the first operator and the second operator. In an aspect, for example, network entity 105 (FIG. 1B) and/or frame determination component 131 (FIG. 1B) may transmit the at least one frame 132 according to the duration of at least the one or more first transmission opportunities (e.g., first transmission opportunity duration 133, FIG. 1B) or the priority (e.g., first operator priority 139 and/or second operator priority 141, FIG. 1B) for at least one of the first operator 112 (FIG. 1B) and the second operator 114 (FIG. 1B).

In some aspects, the least one frame 132 may include a first acquisition interval 134 (FIG. 1A) associated with the first operator 112 and the one or more first transmission opportunities 135 (FIG. 1A) having a guarantee interval for the first operator 112, and a second acquisition interval 136 (FIG. 1A) associated with a second operator 114 different from the first operator 112 and one or more second transmission opportunities 138 (FIG. 1A) having a guarantee interval for the second operator 114. In some aspects, the first acquisition interval 134 and the one or more first transmission opportunities 135 may be nonoverlapping with the second acquisition interval 136 and the one or more second transmission opportunities 138.

In some aspects, the guarantee interval of the one or more first and second transmission opportunities 135 may respectively prioritize medium access without contention to the first operator 112 and the second operator 114. In some aspects, the one or more first transmission opportunities 135 may further include an opportunistic interval for at least the second operator 114 and the one or more second transmission opportunities 138 further include an opportunistic interval for at least the first operator 112.

In some aspects, the first acquisition interval 134 and the second acquisition interval 136 may include at least one of a downlink DRS allocation or an uplink RACH allocation. In some aspects, at least one of the first acquisition interval 134 or the second acquisition interval 136 may be transmitted on a PBCH and indicates an offset relative to a boundary of the at least one frame. Additionally, in some aspects, although not shown, method 700 may transmit a DMRS adjacent to the at least one frame for decoding the PBCH. In some aspects, transmitting the at least one frame 132 may include transmitting on a downlink channel from the network entity 105 to a UE 115.

In some aspects, an apparatus or any component of an apparatus may be configured to (or operable to or adapted to) provide functionality as taught herein. This may be achieved, for example: by manufacturing (e.g., fabricating) the apparatus or component so that the apparatus or component will provide the functionality; by programming the apparatus or component so that the apparatus or component will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communications at a user equipment (UE) associated with a first operator, comprising:
receiving configuration information associated with a frame structure of a frame from a network entity;
wherein the frame structure of the frame includes:
a first acquisition interval authorized for use only by the first operator, wherein the first acquisition interval includes at least one of a downlink allocation or an uplink allocation;
one or more first transmission opportunities, located subsequent to the first acquisition interval, and defining a guarantee interval for the first operator and an opportunistic interval for other operators, wherein the guarantee interval for the first operator prioritizes medium access without contention to the first operator, wherein the opportunistic interval for the other operators allows medium access for one of the other operators on any one of the one or more first transmission opportunities not used by the first operator;
a second acquisition interval authorized for use only by a second operator different from the first operator; and
one or more second transmission opportunities, located subsequent to the second acquisition interval, and defining a guarantee interval for the second operator;
wherein the first acquisition interval and the second acquisition interval are non-overlapping with each other, and are non-overlapping with the one or more first transmission opportunities and the one or more second transmission opportunities within the frame;
receiving, during the downlink allocation of the first acquisition interval, a physical broadcast channel (PBCH) indicating an offset relative to a boundary of the frame;
receiving a demodulation reference signal (DMRS) adjacent to the frame for decoding the PBCH; and
transmitting one or more uplink signals within the frame during at least one of the uplink allocation in the first acquisition interval authorized for use only by the first operator or the one or more first transmission opportunities having the guarantee interval for the first operator.

2. The method of claim 1, wherein the first operator is associated with a first priority and the second operator is associated with a second priority.

3. The method of claim 2, wherein the one or more second transmission opportunities defines an opportunistic interval for at least the first operator, wherein the opportunistic interval for at least the first operator allows medium access for at least the first operator on any one of the one or more second transmission opportunities not used by the second operator.

4. The method of claim 3, wherein the opportunistic interval of the one or more first and second transmission opportunities allows medium access for a third operator having a priority level lower than the first priority or the second priority.

5. The method of claim 2, wherein the first priority is greater than the second priority within the one or more first transmission opportunities having the guarantee interval for the first operator.

6. The method of claim 2, wherein the second priority is greater than the first priority within the one or more second transmission opportunities having the guarantee interval for the second operator.

7. The method of claim 1, wherein the first acquisition interval is adjacent to the second acquisition interval and followed by the one or more first transmission opportunities and the one or more second transmission opportunities.

8. The method of claim 7, wherein the first acquisition interval and the second acquisition interval each include at least one of a downlink clear channel assessment (CCA) exempt transmission (DL-CET) or an uplink CET (UL-CET).

9. The method of claim 1, further comprising receiving, from the network entity, an indication of a duration of at least one of the one or more first transmission opportunities or the one or more second transmission opportunities within the frame.

10. The method of claim 9, wherein transmitting the one or more uplink signals comprises transmitting according to the duration of the one or more first transmission opportunities.

11. The method of claim 1, further comprising receiving, during the downlink allocation of the first acquisition interval, at least one of a downlink discovery reference signal (DRS), system information, or a downlink discovery signal, and wherein transmitting the one or more uplink signals during the uplink allocation of the first acquisition interval further comprises transmitting at least one of an uplink random access channel signal, system critical information, or an uplink discovery signal.

12. The method of claim 1, wherein the first acquisition interval is adjacent to and followed by the one or more first transmission opportunities and the second acquisition interval is subsequent to the one or more first transmission opportunities and adjacent to and followed by the one or more second transmission opportunities.

13. The method of claim 1, wherein each of the one or more first transmission opportunities and the one or more second transmission opportunities include one or more non-overlapping subframes.

14. The method of claim 1, wherein transmitting the one or more uplink signals within the frame further comprises transmitting only during at least one of the uplink allocation, the one or more first transmission opportunities, or the one or more second transmission opportunities when not used by the second operator.

15. A method of wireless communications at a network entity associated with a first operator, comprising:
determining configuration information associated with a frame structure of a frame;
wherein the frame structure of the frame includes:
a first acquisition interval authorized for use only by the first operator, wherein the first acquisition interval includes at least one of a downlink allocation or an uplink allocation;
one or more first transmission opportunities, located subsequent to the first acquisition interval, and defining a guarantee interval for the first operator and an opportunistic interval for other operators, wherein the guarantee interval for the first operator prioritizes medium access without contention to the first operator, wherein the opportunistic interval for the other operators allows medium access for one of the other operators on any one of the one or more first transmission opportunities not used by the first operator;
a second acquisition interval authorized for use only by a second operator different from the first operator; and
one or more second transmission opportunities, located subsequent to the second acquisition interval, and defining a guarantee interval for the second operator;
wherein the first acquisition interval and the second acquisition interval are non-overlapping with each other, and are non-overlapping with the one or more first transmission opportunities and the one or more second transmission opportunities within the frame;
transmitting the configuration information of at least one of the first acquisition interval or the second acquisition interval, on a physical broadcast channel (PBCH), indicating an offset relative to a boundary of the frame;
transmitting a demodulation reference signal (DMRS) adjacent to the frame for decoding the PBCH; and
receiving one or more uplink signals within the frame during at least one of the uplink allocation in the first acquisition interval authorized for use only by the first operator or the one or more first transmission opportunities having the guarantee interval for the first operator.

16. The method of claim 15, wherein the one or more second transmission opportunities defines an opportunistic interval for at least the first operator, wherein the opportunistic interval for at least the first operator allows medium access for at least the first operator on any one of the one or more second transmission opportunities not used by the second operator.

17. The method of claim 15, further comprising transmitting, during the downlink allocation of at least one of the first acquisition interval and the second acquisition interval at least one of a downlink discovery reference signal (DRS), system information, or a downlink discovery signal.

18. The method of claim 15, wherein each of the one or more first transmission opportunities and the one or more second transmission opportunities include one or more non-overlapping subframes.

19. The method of claim 15,
wherein the configuration information comprises a duration of at least one of the one or more first transmission opportunities or the one or more second transmission opportunities within the frame; and wherein transmitting the configuration information includes transmitting an indication of the duration of at least one of the one or more first transmission opportunities or the one or more second transmission opportunities within the frame.

20. An apparatus for wireless communications at a user equipment (UE) associated with a first operator, comprising:
a memory; and
a processor coupled to the memory and configured to:
receive configuration information associated with a frame structure of a frame from a network entity;
wherein the frame structure of the frame includes:
a first acquisition interval authorized for use only by the first operator, wherein the first acquisition interval includes at least one of a downlink allocation or an uplink allocation;
one or more first transmission opportunities, located subsequent to the first acquisition interval, and defining a guarantee interval for the first operator and an opportunistic interval for other operators, wherein the guarantee interval for the first operator prioritizes medium access without contention to the first operator, wherein the opportunistic interval for the other operators allows medium access for one of the other operators on any one of the one or more first transmission opportunities not used by the first operator;
a second acquisition interval authorized for use only by a second operator different from the first operator; and
one or more second transmission opportunities, located subsequent to the second acquisition interval, and defining a guarantee interval for the second operator;
wherein the first acquisition interval and the second acquisition interval are non-overlapping with each other, and are non-overlapping with the one or more first transmission opportunities and the one or more second transmission opportunities within the frame;
receive, during the downlink allocation of the first acquisition interval, a physical broadcast channel (PBCH) indicating an offset relative to a boundary of the frame;
receive a demodulation reference signal (DMRS) adjacent to the frame for decoding the PBCH; and
transmit one or more uplink signals within the frame during at least one of the uplink allocation in the first acquisition interval authorized for use only by the first operator or the one or more first transmission opportunities having the guarantee interval for the first operator.

21. The apparatus of claim 20, wherein the first operator is associated with a first priority and the second operator is associated with a second priority.

22. The apparatus of claim 20, wherein the first acquisition interval is adjacent to and followed by the one or more first transmission opportunities and the second acquisition interval is subsequent to the one or more first transmission opportunities and adjacent to and followed by the one or more second transmission opportunities.

23. The apparatus of claim 20, wherein the first acquisition interval is adjacent to the second acquisition interval and followed by the one or more first transmission opportunities and the one or more second transmission opportunities.

24. The apparatus of claim 20, wherein the processor is further configured to receive, from the network entity, an indication of a duration of at least one of the one or more first transmission opportunities or the one or more second transmission opportunities within the frame.

25. The apparatus of claim 20, wherein the processor configured to transmit one or more uplink signals within the frame is further configured to transmit only during at least one of the uplink allocation, the one or more first transmission opportunities, or the one or more second transmission opportunities when not used by the second operator.

26. An apparatus for wireless communications at a network entity associated with a first operator, comprising:
a memory; and
a processor coupled to the memory and configured to:
determine configuration information associated with a frame structure of a frame;
wherein the frame structure of the frame includes:
a first acquisition interval authorized for use only by the first operator, wherein the first acquisition interval includes at least one of a downlink allocation or an uplink allocation;
one or more first transmission opportunities, located subsequent to the first acquisition interval, and defining a guarantee interval for the first operator and an opportunistic interval for other operators, wherein the guarantee interval for the first operator prioritizes medium access without contention to the first operator, wherein the opportunistic interval for the other operators allows medium access for one of the other operators on any one of the one or more first transmission opportunities not used by the first operator;
a second acquisition interval authorized for use only by a second operator different from the first operator; and
one or more second transmission opportunities, located subsequent to the second acquisition interval, and defining a guarantee interval for the second operator;
wherein the first acquisition interval and the second acquisition interval are non-overlapping with each other, and are non-overlapping with the one or more first transmission opportunities and the one or more second transmission opportunities within the frame;
transmit the configuration information of at least one of the first acquisition interval or the second acquisition interval, on a physical broadcast channel (PBCH), indicating an offset relative to a boundary of the frame;
transmit a demodulation reference signal (DMRS) adjacent to the frame for decoding the PBCH; and
receive one or more uplink signals within the frame during at least one of the uplink allocation in the first acquisition interval authorized for use only by the first operator or the one or more first transmission opportunities having the guarantee interval for the first operator.

27. The apparatus of claim 26,
wherein the configuration information includes a duration of at least one of the one or more first transmission opportunities or the one or more second transmission opportunities within the frame; and wherein to transmit the configuration information includes the processor configured to transmit an indication of the duration of at least one of the one or more first transmission opportunities or the one or more second transmission opportunities within the frame.

* * * * *